(12) United States Patent
Princen et al.

(10) Patent No.: US 7,624,276 B2
(45) Date of Patent: Nov. 24, 2009

(54) SECURE DEVICE AUTHENTICATION SYSTEM AND METHOD

(75) Inventors: John Princen, Cupertino, CA (US); Pramila Srinivasan, Palo Alto, CA (US); Craig Steven Anderson, Sunnyvale, CA (US)

(73) Assignee: BroadOn Communications Corp., Mountain View, CA (US)

( * ) Notice: Subject to any disclaimer, the term of this patent is extended or adjusted under 35 U.S.C. 154(b) by 88 days.

(21) Appl. No.: 11/586,446

(22) Filed: Oct. 24, 2006

(65) Prior Publication Data

US 2008/0091945 A1  Apr. 17, 2008

Related U.S. Application Data

(60) Provisional application No. 60/852,151, filed on Oct. 16, 2006.

(51) Int. Cl.
*G06F 21/00* (2006.01)

(52) U.S. Cl. .................................. 713/177; 713/193

(58) Field of Classification Search ......... 713/155–159, 713/170, 201, 193; 380/229, 232, 247–250
See application file for complete search history.

(56) References Cited

U.S. PATENT DOCUMENTS

| | | | |
|---|---|---|---|
| 5,095,798 A | 3/1992 | Okada et al. | |
| 5,184,830 A | 2/1993 | Okada et al. | |
| 5,238,250 A | 8/1993 | Leung et al. | |
| 5,261,069 A | 11/1993 | Wilkinson et al. | |
| 5,367,698 A | 11/1994 | Webber et al. | |
| 5,400,402 A | 3/1995 | Garfinkle | |
| 5,404,505 A | 4/1995 | Levinson | |
| 5,426,763 A | 6/1995 | Okada | |
| 5,528,513 A | 6/1996 | Vaitzblit et al. | |
| 5,586,264 A | 12/1996 | Belknap et al. | |
| 5,590,199 A * | 12/1996 | Krajewski et al. | ........... 713/159 |
| 5,610,839 A | 3/1997 | Karolak et al. | |
| 5,638,443 A | 6/1997 | Stefik et al. | |
| 5,715,398 A | 2/1998 | Lubenow et al. | |
| 5,715,403 A | 2/1998 | Stefik | |

(Continued)

FOREIGN PATENT DOCUMENTS

EP  0 992 922 A1  4/2000

(Continued)

OTHER PUBLICATIONS

Arbaugh, William A., et al., "A Secure and Reliable Bootstrap Architecture," University of Pennsylvania (1996).

(Continued)

*Primary Examiner*—Gilberto Barron, Jr.
*Assistant Examiner*—Devin Almeida
(74) *Attorney, Agent, or Firm*—Perkins Coie LLP (57) ABSTRACT

A technique for security and authentication on block-based media includes involves the use of protected keys, providing authentication and encryption primitives. A system according to the technique may include a secure device having a security kernel with protected keys. A disk drive security mechanism may support authentication of data, secrecy, and ticket validation using the security kernel and, for example, a ticket services module (e.g., a shared service that may or may not be used by other storage devices like flash).

21 Claims, 10 Drawing Sheets

U.S. PATENT DOCUMENTS

| | | |
|---|---|---|
| 5,765,152 A | 6/1998 | Erickson |
| 5,781,901 A | 7/1998 | Kuzma |
| 5,790,170 A | 8/1998 | Suzuki |
| 5,809,242 A | 9/1998 | Shaw et al. |
| 5,815,662 A | 9/1998 | Ong |
| 5,818,512 A | 10/1998 | Fuller |
| 5,829,046 A | 10/1998 | Tzelnic et al. |
| 5,867,223 A | 2/1999 | Schindler et al. |
| 5,892,900 A | 4/1999 | Ginter et al. |
| 5,903,723 A | 5/1999 | Beck et al. |
| 5,905,860 A | 5/1999 | Olsen et al. |
| 5,913,039 A | 6/1999 | Nakamura et al. |
| 5,933,498 A | 8/1999 | Schneck et al. |
| 5,983,227 A | 11/1999 | Nazem et al. |
| 6,016,348 A | 1/2000 | Blatter et al. |
| 6,032,200 A | 2/2000 | Lin |
| 6,038,601 A | 3/2000 | Lambert et al. |
| 6,044,157 A | 3/2000 | Uesaka et al. |
| 6,049,821 A | 4/2000 | Theriault et al. |
| 6,052,720 A | 4/2000 | Traversat et al. |
| 6,085,193 A | 7/2000 | Malkin et al. |
| 6,141,756 A | 10/2000 | Bright et al. |
| 6,148,340 A | 11/2000 | Bittinger et al. |
| 6,157,721 A | 12/2000 | Shear et al. |
| 6,167,441 A | 12/2000 | Himmel |
| 6,185,625 B1 | 2/2001 | Tso et al. |
| 6,205,475 B1 | 3/2001 | Pitts |
| 6,212,657 B1 | 4/2001 | Wang et al. |
| 6,219,680 B1 | 4/2001 | Bernardo et al. |
| 6,219,708 B1 | 4/2001 | Martenson |
| 6,226,618 B1 | 5/2001 | Downs et al. |
| 6,243,719 B1 | 6/2001 | Ikuta et al. |
| 6,256,637 B1 | 7/2001 | Venkatesh et al. |
| 6,259,471 B1 | 7/2001 | Peters et al. |
| 6,289,452 B1 | 9/2001 | Arnold et al. |
| 6,292,899 B1 | 9/2001 | McBride |
| 6,321,209 B1 | 11/2001 | Pasquali |
| 6,330,566 B1 | 12/2001 | Durham |
| 6,338,050 B1 | 1/2002 | Conklin et al. |
| 6,371,854 B1 | 4/2002 | Ikeda et al. |
| 6,377,972 B1 | 4/2002 | Guo et al. |
| 6,389,460 B1 | 5/2002 | Stewart et al. |
| 6,412,008 B1 | 6/2002 | Fields et al. |
| 6,412,011 B1 | 6/2002 | Agraharam et al. |
| 6,427,238 B1 | 7/2002 | Goodman et al. |
| 6,446,113 B1 | 9/2002 | Ozzie et al. |
| 6,466,048 B1 | 10/2002 | Goodman |
| 6,480,883 B1 | 11/2002 | Tsutsumitake |
| 6,500,070 B1 | 12/2002 | Tomizawa et al. |
| 6,510,502 B1 | 1/2003 | Shimizu |
| 6,526,581 B1 | 2/2003 | Edson |
| 6,544,126 B2 | 4/2003 | Sawano et al. |
| 6,557,104 B2 | 4/2003 | Vu et al. |
| 6,571,279 B1 | 5/2003 | Herz et al. |
| 6,574,605 B1 | 6/2003 | Sansders et al. |
| 6,594,682 B2 | 7/2003 | Peterson et al. |
| 6,606,644 B1 | 8/2003 | Ford et al. |
| 6,637,029 B1 | 10/2003 | Maissel et al. |
| 6,654,388 B1 | 11/2003 | Lexenberg et al. |
| 6,669,096 B1 | 12/2003 | Saphar et al. |
| 6,675,350 B1 | 1/2004 | Abrams et al. |
| 6,691,312 B1 | 2/2004 | Sen et al. |
| 6,697,948 B1 | 2/2004 | Rabin et al. |
| 6,704,797 B1 | 3/2004 | Fields et al. |
| 6,785,712 B1 | 8/2004 | Hogan et al. |
| 6,805,629 B1 | 10/2004 | Weiss |
| 6,811,486 B1 | 11/2004 | Luciano, Jr. |
| 6,826,593 B1 | 11/2004 | Acharya et al. |
| 6,832,241 B2 | 12/2004 | Tracton et al. |
| 6,873,975 B1 | 3/2005 | Hatakeyama et al. |
| 6,901,386 B1 | 5/2005 | Dedrick et al. |
| 6,920,567 B1 | 7/2005 | Doherty et al. |
| 6,928,551 B1 | 8/2005 | Lee et al. |
| 6,993,557 B1 | 1/2006 | Yen |
| 7,092,953 B1 | 8/2006 | Haynes |
| 7,099,479 B1 | 8/2006 | Ishibashi et al. |
| 2001/0014882 A1 | 8/2001 | Stefik et al. |
| 2001/0026287 A1 | 10/2001 | Watanabe |
| 2002/0016818 A1 | 2/2002 | Kirani et al. |
| 2002/0032784 A1 | 3/2002 | Darago et al. |
| 2002/0057799 A1 | 5/2002 | Kohno |
| 2002/0059384 A1 | 5/2002 | Kaars |
| 2002/0071557 A1 | 6/2002 | Nguyen |
| 2002/0085720 A1 | 7/2002 | Okada et al. |
| 2002/0116615 A1 | 8/2002 | Nguyen et al. |
| 2002/0137566 A1 | 9/2002 | Tomizawa et al. |
| 2002/0138764 A1 | 9/2002 | Jacobs et al. |
| 2002/0154779 A1* | 10/2002 | Asano et al. ............... 380/277 |
| 2002/0160833 A1 | 10/2002 | Lloyd et al. |
| 2002/0161673 A1 | 10/2002 | Lee et al. |
| 2002/0162115 A1 | 10/2002 | Brucknet et al. |
| 2002/0165022 A1 | 11/2002 | Hiraoka |
| 2002/0165028 A1 | 11/2002 | Miyamoto et al. |
| 2002/0169974 A1 | 11/2002 | McKune |
| 2002/0184160 A1 | 12/2002 | Tadayon et al. |
| 2003/0009423 A1 | 1/2003 | Wang et al. |
| 2003/0023564 A1 | 1/2003 | Padhye et al. |
| 2003/0028622 A1 | 2/2003 | Inoue et al. |
| 2003/0114227 A1 | 6/2003 | Rubin |
| 2003/0120541 A1 | 6/2003 | Siann et al. |
| 2003/0144869 A1 | 7/2003 | Fung et al. |
| 2003/0157985 A1 | 8/2003 | Shteyn |
| 2003/0182142 A1 | 9/2003 | Valenzuela et al. |
| 2003/0220142 A1 | 11/2003 | Siegel |
| 2004/0015426 A1 | 1/2004 | Tadayon et al. |
| 2004/0039929 A1 | 2/2004 | Decime |
| 2004/0044901 A1 | 3/2004 | Serkowski |
| 2004/0054923 A1 | 3/2004 | Seago et al. |
| 2004/0098297 A1 | 5/2004 | Borthwick |
| 2004/0098580 A1 | 5/2004 | DeTreville |
| 2004/0098610 A1 | 5/2004 | Hrastar |
| 2004/0102987 A1 | 5/2004 | Takahashi et al. |
| 2005/0004875 A1 | 1/2005 | Kontio et al. |
| 2005/0071640 A1* | 3/2005 | Sprunk et al. ............... 713/176 |
| 2006/0031222 A1 | 2/2006 | Hannsmann |
| 2006/0090084 A1 | 4/2006 | Buer |
| 2006/0129848 A1 | 6/2006 | Paksoy et al. |
| 2007/0016832 A1 | 1/2007 | Weiss |
| 2007/0067826 A1 | 3/2007 | Conti |
| 2007/0150730 A1 | 6/2007 | Conti |

FOREIGN PATENT DOCUMENTS

| | | |
|---|---|---|
| EP | 1 091 274 A2 | 4/2001 |
| JP | 2002024178 A1 | 1/2002 |
| WO | WO02/29642 A2 | 4/2002 |
| WO | WO02/30088 A1 | 4/2002 |

OTHER PUBLICATIONS

Aziz, Ashar, et al., "Privacy and Authentication for Wireless Local Area Networks," Sun Microsystems, Inc., (1993).

Bharadvaj et al., Proceedings of the 17th IEEE Symposium on Reliable Distributed Systems, pp. 118-123 (1998).

Davida, George I., et al., "Defending Systems Against Viruses through Cryptographic Authentication," IEEE pp. 312-318 (1989).

Diffie, Whitfield, "The First Ten Years of Public-Key Cryptography," Proceedings of the IEEE, vol. 96, No. 5, pp. 560-577 (May 1988).

Diffie, Whitfield, et al., "New Directions in Cryptography," (1976).

Dyer, Joan G., et al., "Building the IBM 4758 Secure Coprocessor," Computer, pp. 2-12 (Oct. 2001).

Frantzen, Mike, et al., "StackGhost: Hardware Facilitated Stack Protection," Proceedings of the 10th USENIX Security Symposium (2001).

Fujimura, Ko., et al., "Digital-Ticket-Controlled Digital Ticket Circulation," Proceedings of the 8$^{th}$ USENIX Security Symposium (1999).

Gligor, Virgil D., "20 Years of Operating Systems Security," University of Maryland.

Gutmann, Peter, "The Design of a Cryptographic Security Architecture," Proceedings of the 8$^{th}$ USENIX Security Symposium (1999).

Hori et al., *Computer Networks*, 33(1-6):197-211 (2000).

Itoi, Naomaru, "SC-CFS: Smartcard Secured Cryptographic File System," Proceedings of the 10$^{th}$ USENIX Security Symposium (2001).

Jaeger, Trent, et al., "Building Systems that Flexibly Control Downloaded Executable Context," Proceedings of the 6$^{th}$ USENIX UNIX Security Symposium (1996).

Karger, Paul A., "New Methods for Immediate Revocation," IEEE (1989).

Kent, Stephen Thomas, "Protecting Externally Supplied Software in Small Computers," Massachusetts Institute of Technology (1980).

Kogan, Noam, et al., "A Practical Revocation Scheme for Broadcast Encryption Using Smart Cards," Proceedings of the 2003 IEEE Symposium on Security and Privacy (2003).

Lampson, Butler, et al., "Authentication in Distributed Systems" Theory and Practice, Digital Equipment Corporation (1992).

Lotspiech, Jeffrey, et al., "Broadcast Encryption's Bright Future," Computer, pp. 57-63 (Aug. 2002).

Lotspiech, Jeffrey, et al., "Anonymous Trust: Digital Rights Management Using Broadcast Encryption," Proceedings of the IEEE, vol. 92, No. 6, pp. 898-909 (Jun. 2004).

Monrose, et al., "Toward Speech-Generated Cryptographic Keys on Resource Constrained Devices," Proceedings of the 11$^{th}$ USENIX Security Symposium (2002).

Nonnenmacher, Jorg et al., "Asynchronous Multicast Push: AMP." 13$^{th}$ International Conference on Computer Commnication, Nov. 18-21, 1997, pp. 419-430,13, Proceedings of International Conference on Computer Communication, Cannes.

Neumann, P.G., et al., "A Provably Secure Operating System," Stanford Research Institute (1975).

Palmer, Elaine R., "An Introduction to Citadel—A Secure Crypto Coprocessor for Workstations," IBM Research Division (1992).

Peterson, David S., et al., "A Flexible Containment Mechanism for Executing Untrusted Code," Proceedings of the 11$^{th}$ USENIX Security Symposium (2002).

Rodriguez, Pablo et al. Improving the WWW: Caching or Multicast? Computer Networks and ISDN Systems. Nov. 25, 1998, 30(22-23):2223-2243.

Rubin, Aviel D., "Trusted Distribution of Software Over the Internet," Internet Society 1995 Symposium on Network and Distributed System Security.

Smith, Sean W., "Secure Coprocessing Applications and Research Issues," Los Alamos Unclassified Release LA-UR-96-2805 (1996).

Smith, Sean W., et al., "Building a High-Performance, Programmable Secure Coprocessor," Secure Systems and Smart Cards, IBM T.J. Watson Research Center, NY (1998).

Smith, Sean W., et al., "Using a High-Performance, Programmable Secure Coprocessor," Proceedings of the Second International Conference on Financial Cryptography.

Smith, Sean, et al., "Validating a High-Performance, Programmable Secure Coprocessor," Secure Systems and Smart Cards, IBM T.J. Watson Research Center, NY.

Stefik, Mark, "Trusted Systems," Scientific American, pp. 78-81 (Mar. 1997).

Traylor, Scott, "Graphic Resolution and File Sizes", http://www.traylormm.com/harvard/53graphicresolution/.

Tygar, J.D., et al., "Strongbox: A System for Self-Securing Programs," pp. 163-197.

Tygar, J.D. et al., "Dyad: A System for Using Physically Secure Coprocessors," School of Computer Science, Carnegie Mellon University (1991).

Van Doom, Leendert, "A Secure Java™ Virtual Machine," Proceedings of the 9$^{th}$ USENIX Security Symposium (2000).

Wang, Zheng et al. "Prefetching in World Wide Web." Global TeleCommnications Conference, Nov. 18-22, 1996, pp. 28-32, London.

White, et al., "ABYSS: An Architecture for Software Protection," IEEE Transactions on Software Engineering, vol. 16, No. 6, pp. 619-629(1990).

White, Steve R., et al., "Introduction to the Citadel Architecture: Security in Physically Exposed Environments," IBM Research Division (1991).

Wobber, Edward, et al., "Authentication in the Taso Operating System," Digital Systems Research Center (1993).

Yee, B., et al., "Secure Coprocessors in Electronic Commerce Applications," Proceedings of the First USENIX Workshop on Electronic Commerce (1995).

Yee, B., "Using Secure Coprocessors," PhD Thesis, School of Computer Science, Carnegie Mellon University, Pittsburgh, PA (1994).

David A Dodson, "Gain Some Perspective With Innovation's GBA to TV Converter" Jun. 6, 2002, http://www.viewonline.com/page/articles/innovationsGBATV.htm>, Accessed Mar. 29, 2008.

Game Boy, <http://en.wikipedia.org/wiki/Game_Boy_Advanced> Accessed Mar. 30, 2008.

Game Boy Advance,<http://en.wikipedia.org/wiki/Game_Boy_Advanced> Accessed Mar. 30, 2008.

Game Cube,<http://en.wikipedia.org/wiki/Game_Cube> Accessed Mar. 28, 2008.

* cited by examiner

SECURE DEVICE AUTHENTICATION SYSTEM AND METHOD

This application claims priority to U.S. Provisional Application No. 60/852,151, entitled SECURE DEVICE AUTHENTICATION SYSTEM AND METHOD, filed Oct. 16, 2006, which is hereby incorporated by reference in its entirety.

BACKGROUND

Authentication and other security issues are currently areas of extensive research and development, both theoretical and practical. One field of endeavor is the authentication of data on a DVD or comparable technology, which may or may not include CDs and new DVD technologies, but is typically applicable across DVD technologies due to the similarities between DVD technologies. With DVDs, CDs, and other freely distributable media disks, the authentication has to be particularly strong (e.g., use a cryptographic method).

Disk-based media are typically block-based devices. So the access time of block data and the computation time of any cryptographic algorithm used should meet the specifications of a system on which the disk-based media are used. Moreover, the contents could sometimes be encrypted for secrecy. Other considerations for secure device secrecy and authenticity techniques for disk-based media include that the technique should support a read-only medium, should support mass production of disks (not requiring custom or unique data on each disk), and the additional data stored on the disk for authentication should only impose a reasonable overhead.

Some efforts to meet these requirements have been proposed, but, as is the case with many solutions in secrecy and authentication techniques, there is room for improvement. For example, one could attach a block signature based on public key cryptography (example, RSA signature), but this is relatively slow since every block of data that is read would require an RSA signature calculation. Besides, the size of an RSA signature for every block would impose a relatively high overhead. As another example, one could attach a SHA hash (or equivalent) for every block written in a custom protected area of disk, but this would require the manufacture of custom disks. As another example, one could attach a secret-key based message authentication code such as HMAC (or equivalent) for each block, but if the HMAC has to be the same for all disks, this becomes a common secret key mechanism, which may not provide a desired level of security. As another example, one could use a hierarchical signature approach that requires multiple seeks of the block device for every block access, to read the members of the hierarchy, but this may lead to increased latency.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for security and authentication on block-based media includes involves the use of protected keys, providing authentication and encryption primitives. A system according to the technique may include a secure device having a security kernel with protected keys. A disk drive security mechanism may support authentication of data, secrecy, and ticket validation using the security kernel and, for example, a ticket services module (e.g., a shared service that may or may not be used by other storage devices like flash). Depending upon the implementation, the security kernel, disk drive security mechanism, and ticket services module may operate in three different execution spaces, and can be commonly used by various I/O and storage devices including, by way of example but not limitation, an optical disk.

In a non-limiting embodiment, the block-based media is read-only, but the technique may be applicable on write once, read many (WORM), writable, or other block-based media. The technique may also be applicable to other storage media, other licensing mechanisms leading to alternate methods to derive the encryption key, and/or other transport media (for example, Internet packet-based download.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
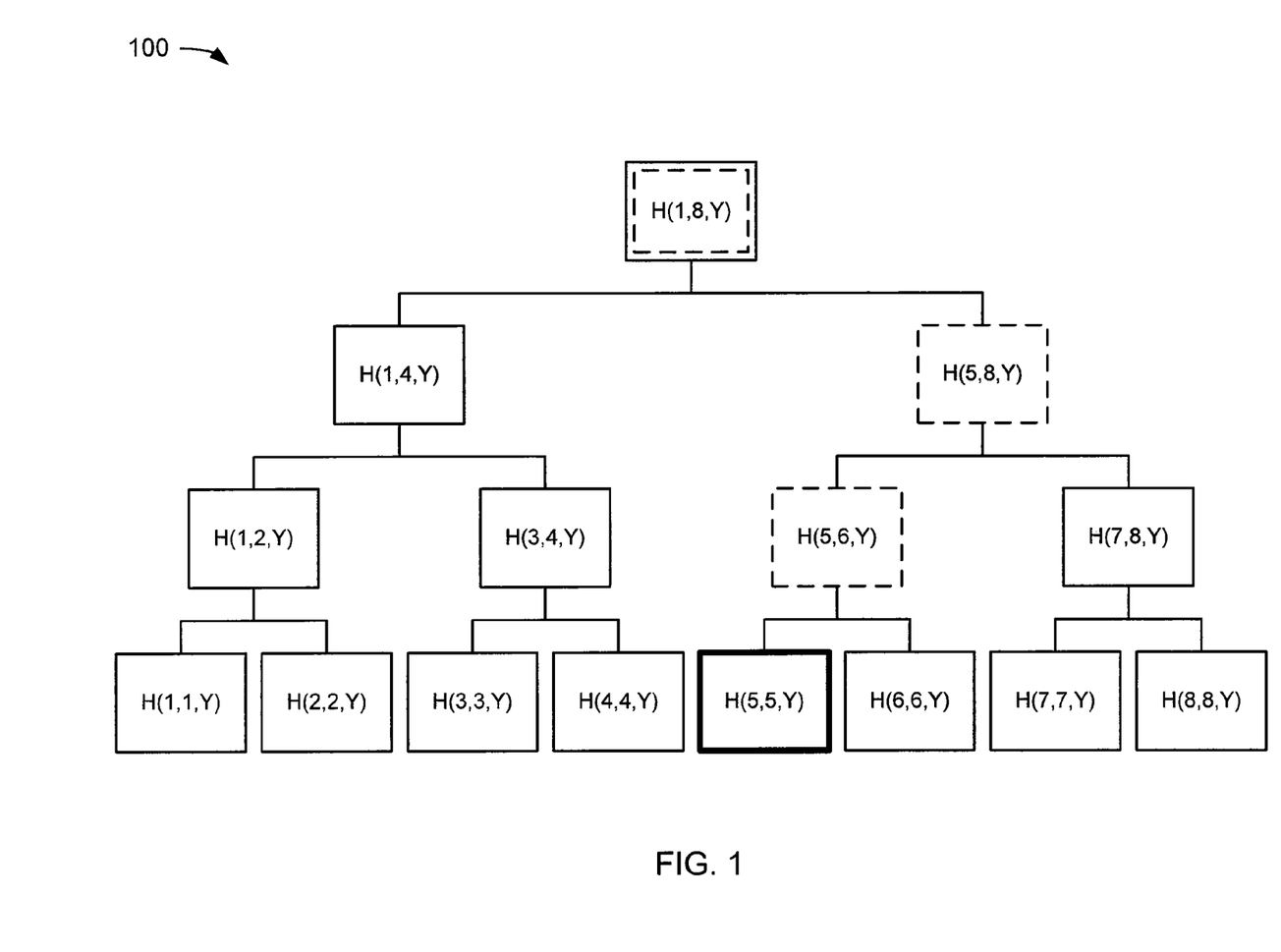
FIG. 1 depicts an example of a binary tree structure associated with a hierarchical hashing technique.

FIG. 1 depicts an example of a binary tree structure 100 associated with a hierarchical hashing technique. The notation is as used in U.S. Pat. No. 4,309,569 entitled "Method of Providing Digital Signatures," which was issued Jan. 5, 1982 to Merkle, and which is incorporated herein by reference. A set of data blocks $\{Y_1 \ldots Y_k \ldots Y_n\}$, $1<=k<=n$, are to be authenticated. In the example of FIG. 1, n=8. A block $Y_k$ is authenticated using $Y_k$, and a set of values H(i, j, Y). A transmitted block $Y_k$ and a corresponding set of values H(i, j, Y) can be independently used to establish the authenticity of $Y_k$. H(i, j, k) is defined as:

$$H(i,i,Y)=F(Y_i)$$

$$H(i,j,Y)=F(H(i,(i+j-1)/2,Y),H((i+j+1)/2,j,Y)),$$

where $F(Y_i)$ is a one-way function such as SHA-1. It follows that H(i, j, Y) is a one-way function of $Y_i, Y_{i+1}, \ldots Y_j$, and H(1, n, Y) is a one-way function of $Y_1$ through $Y_n$. Thus, the receiver can selectively authenticate $Y_k$ and a set of values of H.

In order to trust the root value, H(1,8,Y), of the binary tree structure 100, it should be possible to obtain, for example, a public key-based cryptographic signature (e.g., a RSA signature) against the value. The signature can be validated with appropriate certificate chain validation up to a trusted root key. However, any applicable known or convenient security mechanism could be used for the purpose of establishing trust.

In the example of FIG. 1, in order to authenticate $Y_5$, it is necessary to have a trusted H(1, 8, Y) and receive H(6, 6, Y), H(7, 8, Y), and H(1, 4, Y). H(5,6,Y) and H(5,8,Y) can be derived. For illustrative purposes, these boxes are shaded in FIG. 1, the boxes representing the derivative values have dashed lines, the H(5,5,Y) is the target of validation and is represented in a block by a heavy line, and the root, H(1,8,Y) is surrounded by both dashed an unbroken lines to represent that H(1,8,Y) is both received and derived. For authentication to succeed, the received and derived values of H(1,8,Y) must match. Values associated with the unshaded boxes need not be known to authenticate $Y_5$.

In the example of FIG. 1, the target, H(5,5,Y), and a first one of the received values, H(6,6,Y), together can be used to derive H(5,6,Y) using the definition of H(i,j,k) above. The derived value, H(5,6,Y), and a second one of the received values, H(7,8,Y), can be used to derive H(5,8,Y). The derived value, H(5,8,Y), and a third one of the received values, H(1, 4,Y) can be used to derive the root H(1,8,Y). H(1,8,Y) was also a fourth received value. If the derived and received values of H(1,8,Y) match, then H(5,5,Y) is authenticated, assuming the fourth received value is trusted.

Groups of H( ) values belonging to different levels of the binary tree structure 100 can be denoted by their level in the hierarchy. For example:

H3:=H(1,8,Y)
H2:=values from {H(1,4,Y), H(5,8,Y)}
H1:=values from {H(1,2,Y), H(3,4,Y), H(5,6,Y), ... }
H0:=values from {H(1,1,Y), H(2,2,Y), H(3,3,Y), ... }

Thus H0 hashes refer to hashes of data blocks $Y_1, Y_2$, etc., the leaf nodes of the binary tree structure 100. The structure of a tree may be defined by the number of levels in the hierarchy and the number of children for each node in the tree structure.

The technique described with reference to FIG. 1 can be extended to other non-binary tree structures. The choice of structure may be governed by, by way of example but not limitation, the resulting sizes of data block and authentication data required to authenticate a block; the number of one-way hash function (e.g., SHA-1) calculations to satisfy the desired data read rate from the device; the need to minimize seeks and have the authentication data available as a side-effect of reading the data or in other ways minimize the read overhead for the authentication data; the maximum size of data that has to be covered by the tree.

Figure 2:
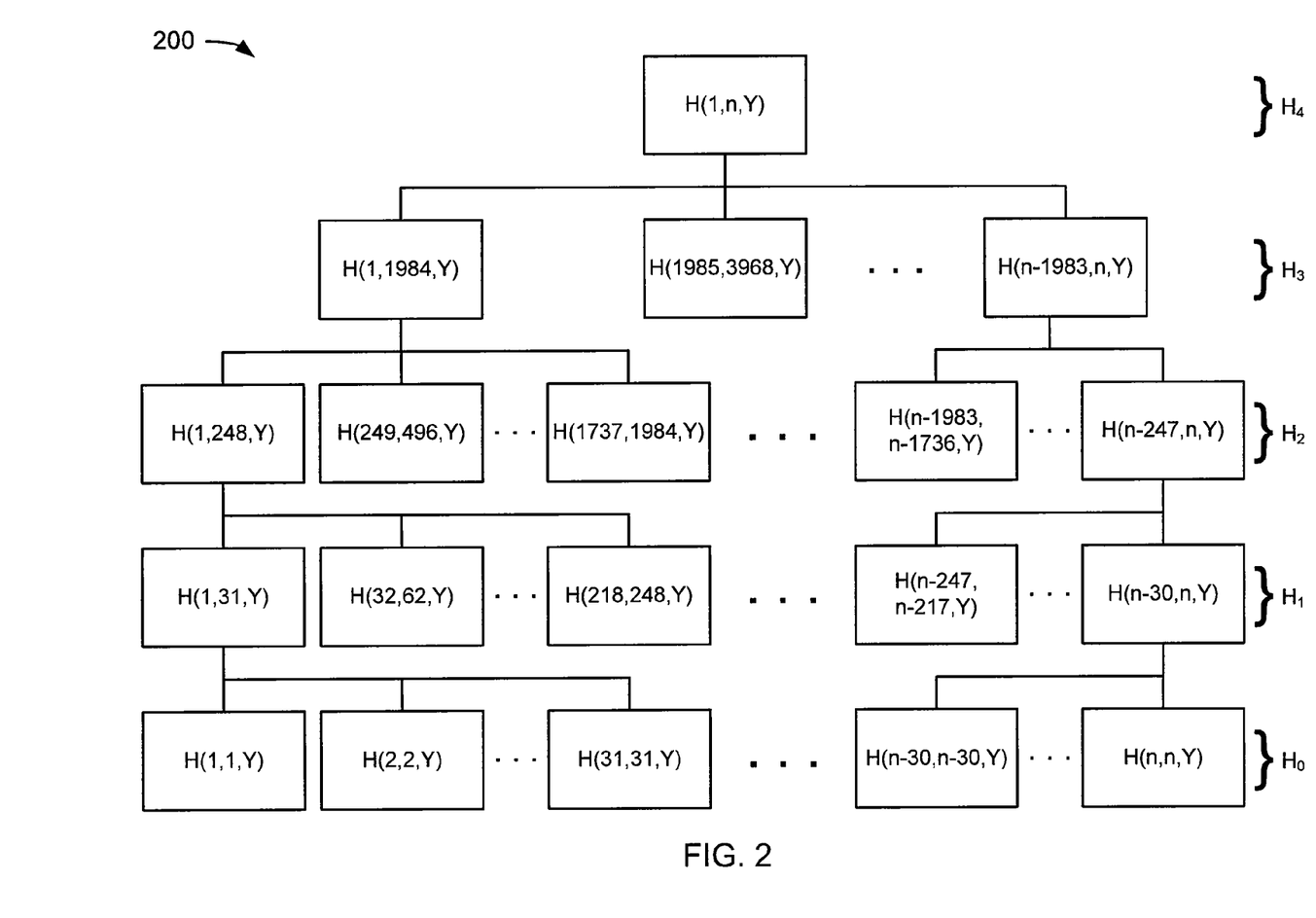
FIG. 2 depicts a non-binary tree structure associated with a hierarchical hashing technique.

FIG. 2 depicts a non-binary tree structure 200 associated with a hierarchical hashing technique. The structure of the tree chosen for the example of FIG. 2 is one that satisfies the above requirements for a block-based media device, such as a DVD disk, and leads to a placement of the H0, H1 . . . values along with data blocks $Y_1, Y_2$ etc on the device.

In the example of FIG. 2, the H0 hashes 202 are chosen as H(1,1,Y), H(2,2,Y) etc., where each H0 hash covers one 1K data block. The data block size is chosen to be 1K bytes, but could be of any convenient size.

In the example of FIG. 2, the H1 hashes of the non-binary tree structure 200 are chosen as H(1,31,Y), H(32,62,Y) etc. That is, in the example of FIG. 2, each H1 covers 31 blocks of data. In other implementations, rather than 31 blocks of data, any convenient number of blocks could be used instead. The 31 blocks of data conform to a data block illustrated by way of example but not limitation in FIG. 3.

Figure 3:
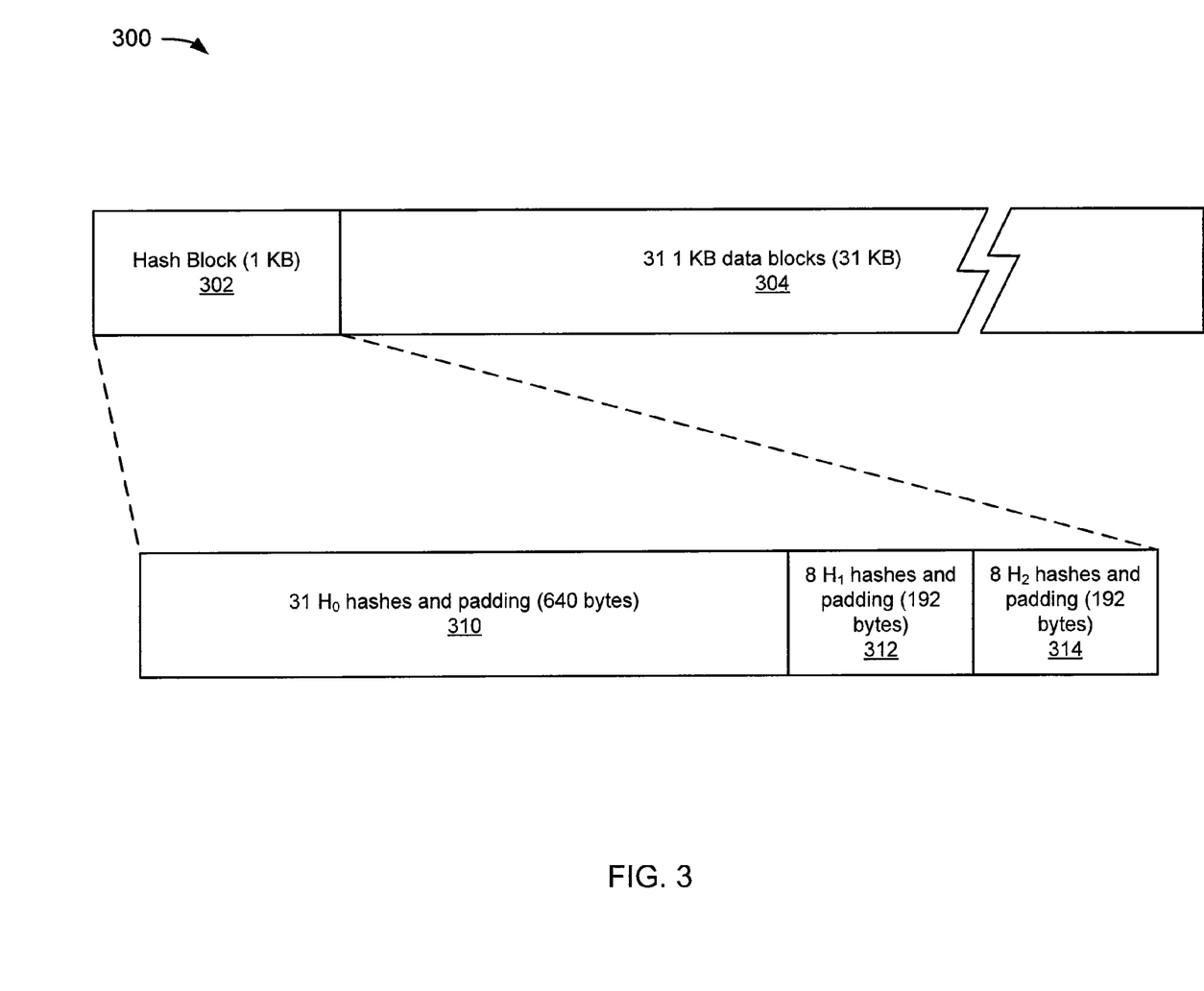
FIG. 3 depicts an example of a 32 KB block.

FIG. 3 depicts an example of a 32 KB block 300. The 32 KB block 300 includes a hash block 302 and 31 1 KB data blocks 304. The hash block include hashes and padding, which are described later. Depending upon the implementation, the 31 1 KB data blocks 304 could be preceded by or interleaved with the hash block 302 and stored together in the 32 KB block 300 on, for example, a DVD disk.

Referring once again to the example of FIG. 2, the H2 hashes are chosen as follows: H(1,31*8,Y), H(31*8+1, 31*2*8,Y) etc. That is, each H2 hash covers 31*8 blocks of data. This translates to each H2 node having 8 children in H1. In this example, the multiplicand is an '8', however any convenient number could be chosen. Increasing the multiplicand has the effect of decreasing the number of nodes in H3 (unless a counterbalancing action is taken), while decreasing the multiplicand will have the opposite effect.

The H3 hashes are chosen as H(1,31*8*8, Y), H(31*8*8+ 1,31*2*8*8, Y) etc. That is, each H3 hash covers 31*8*8 blocks of data. This translates to each H3 node having 8 children in H2. In this example, the multiplicand is an '8', however any convenient number could be chosen. In a non-limiting embodiment, the number of H3 hashes is chosen to cover the maximum size of the data covered by the authentication mechanism. For example, 4182 hashes may be used in a 9.4G implementation, while 768 hashes may be used in a 1.5 G implementation. In the example of FIG. 2, the non-binary tree structure 200 includes n hashes, which is intended to be a generalization for any size block-based media device with the parameters indicated for this example.

A final H4 hash (the root of the tree hierarchy) is a signed value, and is signed by using known or convenient public key signature methods in a secure server authorized to publish the content data. The size of the content may or may not be arbitrary. In order to compute values of the hierarchy the additional content blocks or hash values may be padded as random bytes. The techniques described with reference to FIG. 2 can be used with DVD blocks, or extended to other applications.

Referring once again to FIG. 3, the hash block 302, which is subdivided, in this example, into 31 H0 hashes and padding 310, 8 H1 hashes and padding 312, and 8 H2 hashes and padding 314.

A header (not shown), such as a disk header, would typically be included with the 32 KB block 300. The header may be prepended, appended, or otherwise included with the block of data. In a non-limiting embodiment, the header includes the H4 hash and the relevant H3 hash (see, e.g., FIG. 2). In an alternative embodiment the relevant H3 could be derived from all 8 of the H2 hashes, and would not have to be provided, though this may require accessing data from the whole block-based device.

In a non-limiting embodiment, the header may include a signed data structure called a "ticket" which includes at least the final hash (e.g., H4), a content identification, and an optional key. The key may, for example, be signed by a content publishing server using a public key signature method such as, by way of example but not limitation, RSA. In a non-limiting embodiment, the ticket may include other rights management data granting rights to the content and a signature by another licensing server. The header may further include ancillary data structures to help validate the signatures, such as a chain of certificates, revocation lists, etc. Rights management licenses may be used in conjunction with other rights management licenses delivered by alternate means, to reduce or extend the rights applicable to the content.

Following the header, the hash blocks 310, 312, 314 and the 31 1 KB data blocks 304 may be interleaved. In the example of FIG. 3, one block is 32 KB, and the first 1 KB block is reserved as the hash block 302. In an embodiment, the hash block 302 may include all authentication data needed to validate the 31 1 KB data blocks 304, assuming the header is preloaded. The 31 1 KB data blocks 304 may include content. Any applicable known or convenient hash algorithm may be used. For example, SHA1, where the hash size is 20 bytes, would suffice.

In an embodiment, all data blocks are encrypted (e.g., using AES encryption) to ensure copy protection of the content. In an alternative embodiment, some of the data blocks may not be encrypted. In a non-limiting embodiment, data is decrypted starting from the hash block 302. Any known or convenient technique may be used to decrypt the hashes. For example, a constant known value may be chosen to decrypt the beginning of the hash block 302, and a portion of the H2 hashes may be used as a value for the data block decryption. The decryption key may be obtained as a byproduct of a ticket validation procedure (see, e.g., FIG. 5).

Figure 4:
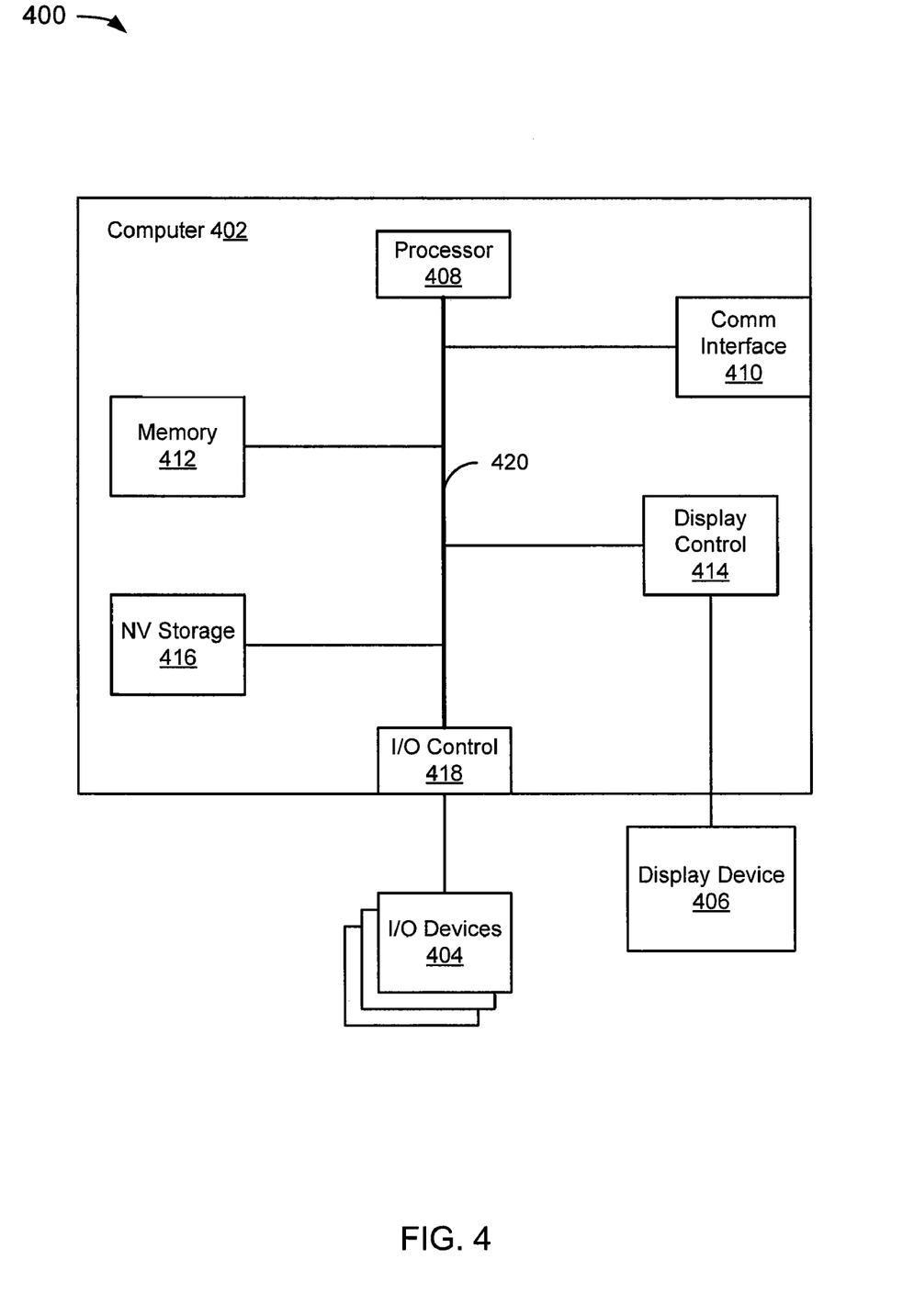
FIG. 4 depicts a computer system suitable for implementation of the techniques described above with reference to FIGS. 1-3.

FIG. 4 depicts a computer system 400 suitable for implementation of the techniques described above with reference to FIGS. 1-3. The computer system 400 includes a computer 402, I/O devices 404, and a display device 406. The computer 402 includes a processor 408, a communications interface 410, memory 412, display controller 414, non-volatile storage 416, and I/O controller 418. The computer 402 may be coupled to or include the I/O devices 404 and display device 406.

The computer 402 interfaces to external systems through the communications interface 410, which may include a modem or network interface. The communications interface 410 can be considered to be part of the computer system 400 or a part of the computer 402. The communications interface 410 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 410 optional in the strictest sense of the word.

The processor 408 may include, by way of example but not limitation, a conventional microprocessor such as an Intel Pentium microprocessor or Motorola power PC microprocessor. While the processor 408 is a critical component of all conventional computers, any applicable known or convenient processor could be used for the purposes of implementing the techniques described herein. The memory 412 is coupled to the processor 408 by a bus 420. The memory 412, which may be referred to as "primary memory," can include Dynamic Random Access Memory (DRAM) and can also include Static RAM (SRAM). The bus 220 couples the processor 408 to the memory 412, and also to the non-volatile storage 416, to the display controller 414, and to the I/O controller 418.

The I/O devices 404 can include a keyboard, disk drives, printers, a scanner, and other input and output devices, including a mouse or other pointing device. For illustrative purposes, at least one of the I/O devices is assumed to be a block-based media device, such as a DVD player. The display controller 414 may control, in a known or convenient manner, a display on the display device 406, which can be, for example, a cathode ray tube (CRT) or liquid crystal display (LCD).

The display controller 414 and I/O controller 418 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 416, which may be referred to as "secondary memory," is often a magnetic hard disk, an optical disk, or another form of storage for large amounts of data. Some of this data is often written, by a direct memory access process, into memory 412 during execution of software in the computer 402. The non-volatile storage 416 may include a block-based media device. The terms "machine-readable medium" or "computer-readable medium" include any known or convenient storage device that is accessible by the processor 408 and also encompasses a carrier wave that encodes a data signal.

The computer system 400 is one example of many possible computer systems which have different architectures. For example, personal computers based on an Intel microprocessor often have multiple buses, one of which can be an I/O bus for the peripherals and one that directly connects the processor 408 and the memory 412 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 412 for execution by the processor 408. A Web TV system, which is known in the art, is also considered to be a computer system, but it may lack some of the features shown in FIG. 4, such as certain input or output devices. A typical computer system will usually include at least a processor, memory, and a bus coupling the memory to the processor.

The computer system 400 may be controlled by an operating system (OS). An OS is a software program-used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

Figure 5:
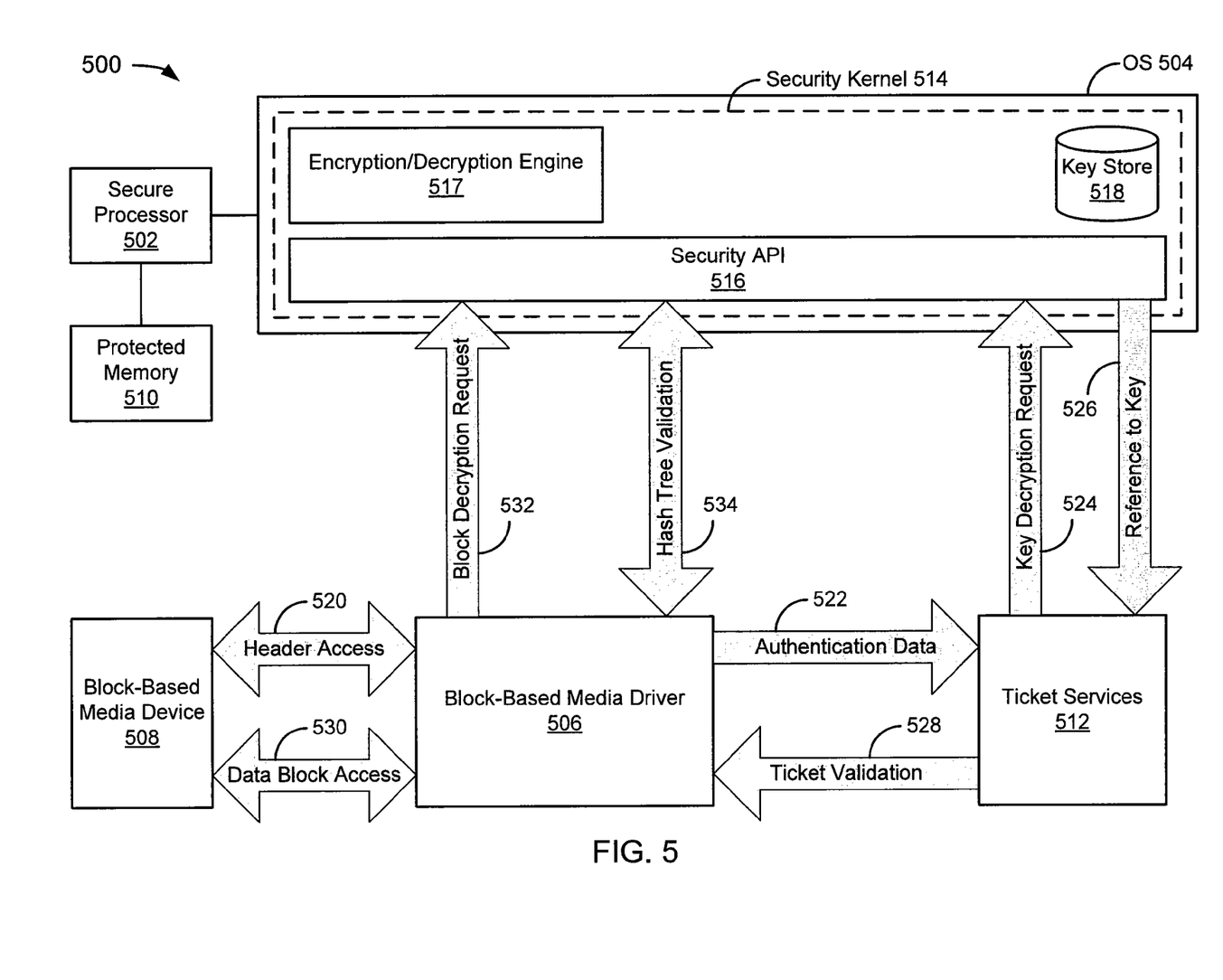
FIG. 5 depicts an example of a secure system suitable for implementation of the techniques described above with reference to FIGS. 1-3.

FIG. 5 depicts an example of a secure system 500 suitable for implementation of the techniques described above with reference to FIGS. 1-3. A typical secure system 500 may include a game console, media player, an embedded secure device, a "conventional" PC with a secure processor, or some other computer system that includes a secure processor.

In the example of FIG. 5, the secure system 500 includes a secure processor 502, an OS 504, a block-based media driver 506, a block-based media device 508, protected memory 510, and ticket services 512. In the example of FIG. 5, the OS 504 includes a security kernel 514, which in turn includes a key store 516 and a security API 518. It should be noted that one or more of the described components, or portions thereof, may reside in the protected memory 510, or in unprotected memory (not shown). It should further be noted that the security kernel 514 is depicted as residing inside the OS 504 by convention only. It may or may not actually be part of the OS 504, and could exist outside of an OS or on a system that does not include an OS. For the purposes of illustrative simplicity, it is assumed that the OS 504 is capable of authentication.

For illustrative simplicity, protected memory is represented as a single memory. However protected memory may include protected primary memory, protected secondary memory, and/or secret memory. It is assumed that known or convenient mechanisms are in place to ensure that memory is protected. The interplay between primary and secondary memory and/or volatile and non-volatile storage is known so a distinction between the various types of memory and storage is not drawn with reference to FIG. 5.

The ticket services 512 may be thought of as "digital license validation services" and, in a non-limiting embodiment, may include known or convenient procedures associated with license validation. For example, the ticket services 512 may include procedures for validating digital licenses, PKI validation procedures, etc. In the example of FIG. 5, the ticket services 512 can validate a ticket on the block-based media device 508. In operation, the block-based media driver 506 obtains the ticket from the block-based media device 508. The block-based media driver 506 then provides the ticket to the ticket services 512, which proceeds to validate the ticket. If the ticket is valid, the block-based media driver 506 is permitted to decrypt blocks associated with the ticket.

In an embodiment, the security kernel 514 may be loaded at start-up. In another embodiment, a portion of the security kernel may be loaded at start-up, and the remainder loaded later. An example of this technique is described in application Ser. No. 10/360,827 entitled "Secure and Backward-Compatible Processor and Secure Software Execution Thereon" filed on Feb. 7, 2003 by Srinivasan et al., which is incorporated by reference. Any known or convenient technique may be used to load the security kernel 514 in a secure manner.

The key store 516 is a set of locations for keys. The key store 516 may be thought of as an array of keys, though the data structure used to store the keys is not critical. Any applicable known or convenient structure may be used to store the keys. In a non-limiting embodiment, the key store 516 is initialized with static keys, but variable keys are not initialized (or are initialized to a value that is not secure). For example, some of the key store locations are pre-filled with trusted values (e.g., a trusted root key), with the remaining extra index slots left unused.

The security API 518 is capable of performing operations using the keys in the key store 516 without bringing the keys out into the clear (i.e., the keys do not leave the security kernel 514). The security API 518 may include services to create, populate and use keys (and potentially other security material) in the key store 516. In an embodiment, the security API 518 also provides access to internal secrets and non-volatile data, including secret keys and device private key. Depending upon the implementation, the security API 518 may support AES and SHA operations using hardware acceleration.

In an embodiment, some operations performed by the security API 518 include encryption and decryption. For example, in operation, an application may request of the security API 518 a key handle that the application can use for encryption, then request that the API 518 encrypt data using the key handle. Advantageously, the API 518 provides the key handle in the clear, but the key itself never leaves the security kernel 514.

In the example of FIG. 5, the block-based media driver 506 may be configured to perform the following security operations while reading from the block-based media device 508:

1) Decrypt the media device 508 using a secret key, and

2) Authenticate content on the media device 508 using authentication data on the media device 508. (Read fails if the authentication fails.)

In the example of FIG. 5, to perform these security operations, the block-based media driver 506 may make use of other secure services in the system 500, such as the ticket services 512 and the security API 518. In an embodiment, each of these modules executes in a separate execution space for system security. In order to validate data blocks, the block-based media driver 506 reads a data block header, and uses the ticket services 512 to validate the ticket using data in the header. To support the decryption of the blocks, the ticket may include an encrypted key. The ticket services 512 decrypts the key using services in the security kernel 514.

In an embodiment, the security kernel 514 uses secret common keys from the key store 518 to perform this decryption. In another embodiment, the ticket services 512 could use a device personalized ticket obtained from flash or network (not shown), validate some rights to content, and then return the key. In any case, this process returns to the block-based media driver 506 a reference to a key for use in decrypting blocks. This key reference is used by the block-based media driver 506 to make subsequent calls to the security kernel 514 to decrypt blocks associated with the key.

After decryption, the block-based media driver 506 makes calls to the security API 516 (or some other interface to a hash computation engine) to validate a hierarchical hash tree associated with the ticket. (See, e.g., FIG. 3.) The security API 516 validates the root hash against the one in the ticket. Assuming validation is successful, the content associated with the ticket is made available for use.

An example of data flow in the system 500 is provided for illustrative purposes as arrows 520-536. Receiving the block header at the block-based media driver 506 is represented by a data block header arrow 520 from the block-based media device 508 to the block-based media driver 506. Sending data from the data block header, including a ticket, to the ticket services 512 is represented by an authentication data arrow 522. The ticket may include an encrypted key. Sending a request to the security API 516 to decrypt the key is represented as a key decryption request arrow 524. Returning a reference to the decrypted key, now stored in the key store 518, is represented by a reference to key arrow 526. After a successful validation of the ticket, the ticket services will send ticket validation data to the block-based media driver 506, including a reference to a key that the driver can use to decrypt blocks. The data sent from the ticket services 512 to the block-based media driver 506 is represented as a ticket validation arrow 528. A data block access arrow 530 represents reading blocks from the block-based media device 508 by the block-based media driver 506. The data access may or may not occur concurrently with the receipt of the header (520). The accessed blocks are decrypted using the ticket validation data (528) and a block decryption request arrow 532 represents the request. A hash tree validation arrow 534 represents a subsequent validation of the content of a block.

In an alternative embodiment, values of portions of a hierarchical hash tree could be hashed for future reference. This could save some hash computation time.

Figure 6A:
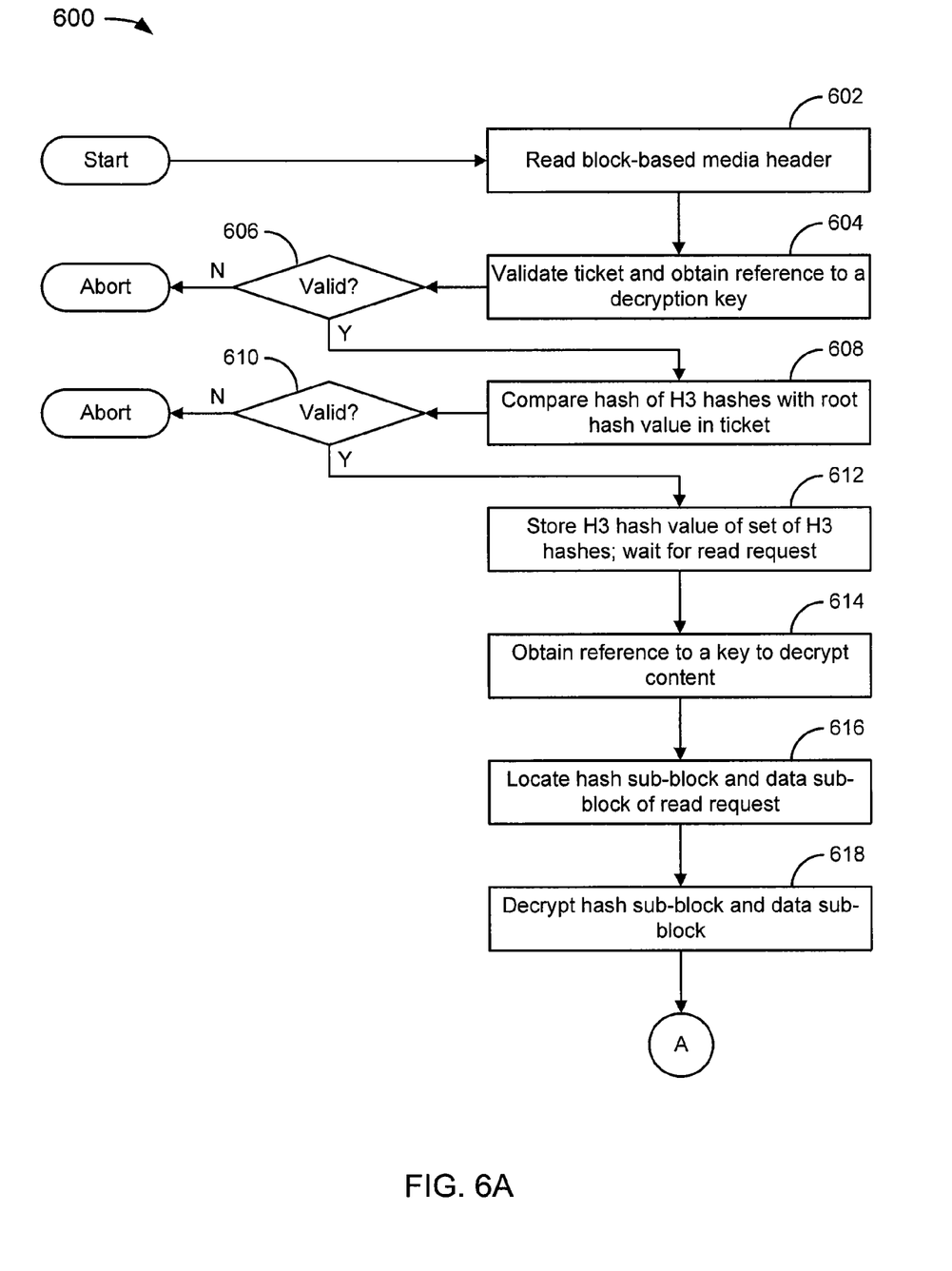
FIGS. 6A and 6B depict a flowchart of an example of a method for secure block-based media access.
Figure 6B:
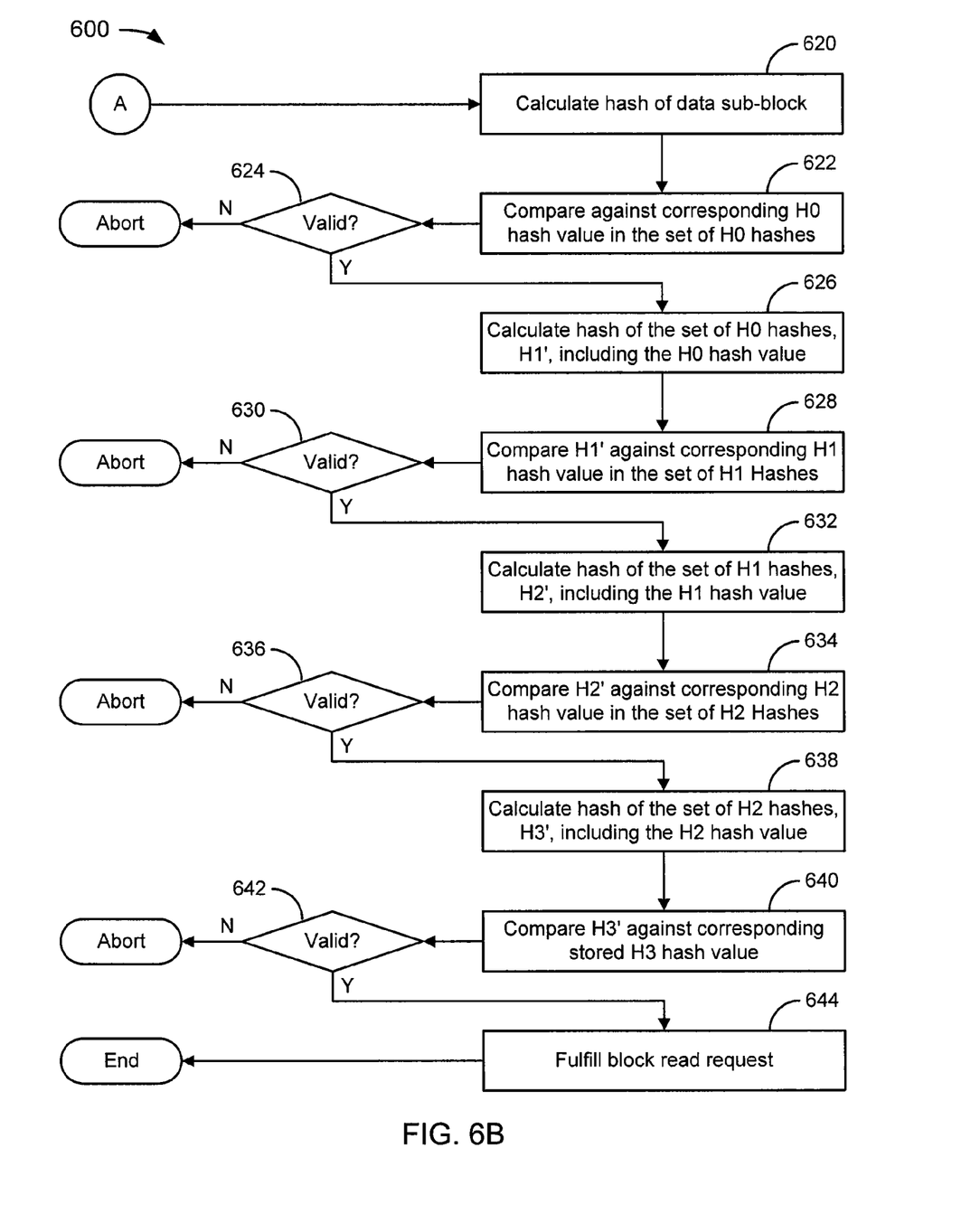
Figure 7A:
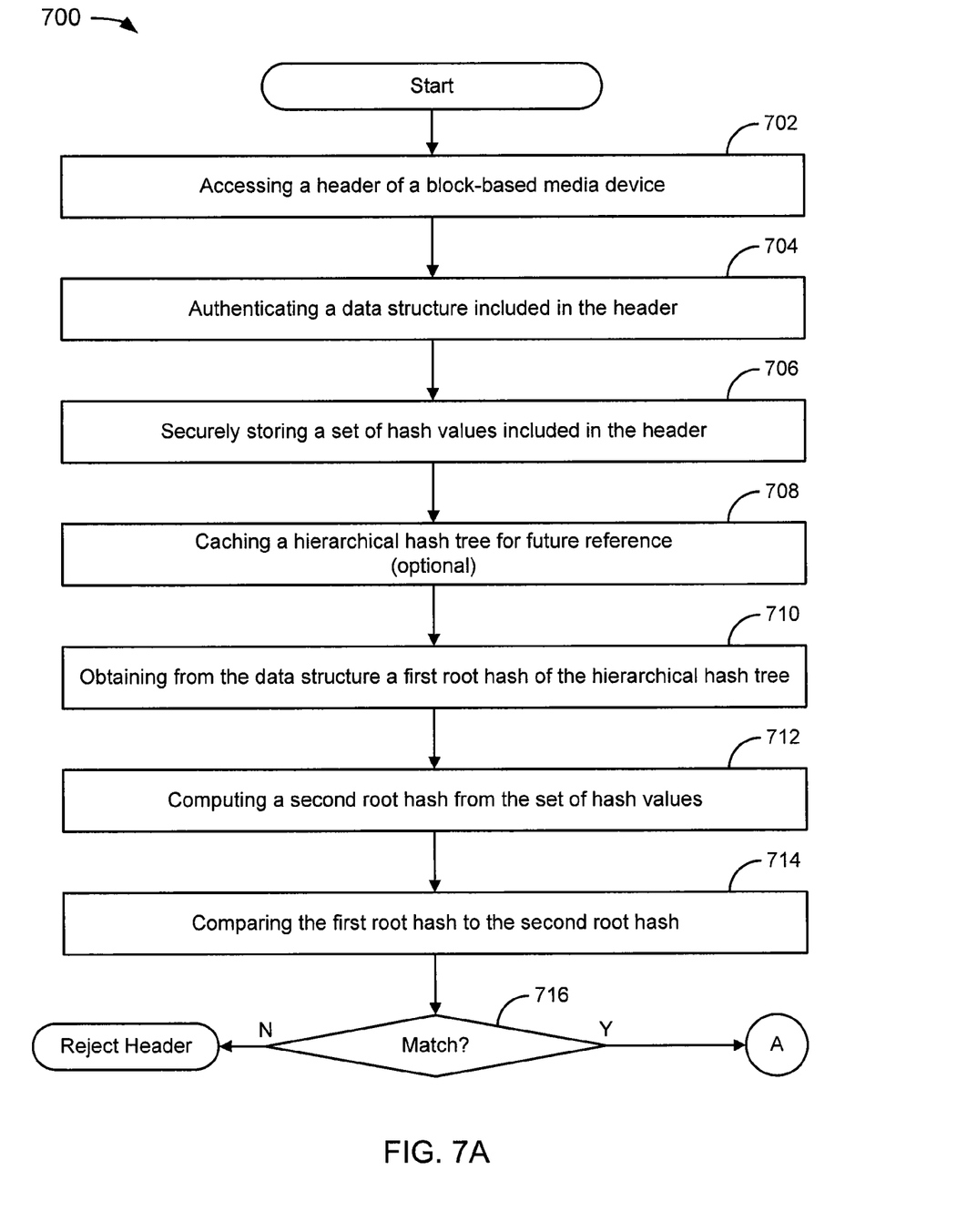
FIGS. 7A, 7B, and 7C depict a flowchart 700 of an alternative method for secure block-based media access.
Figure 7B:
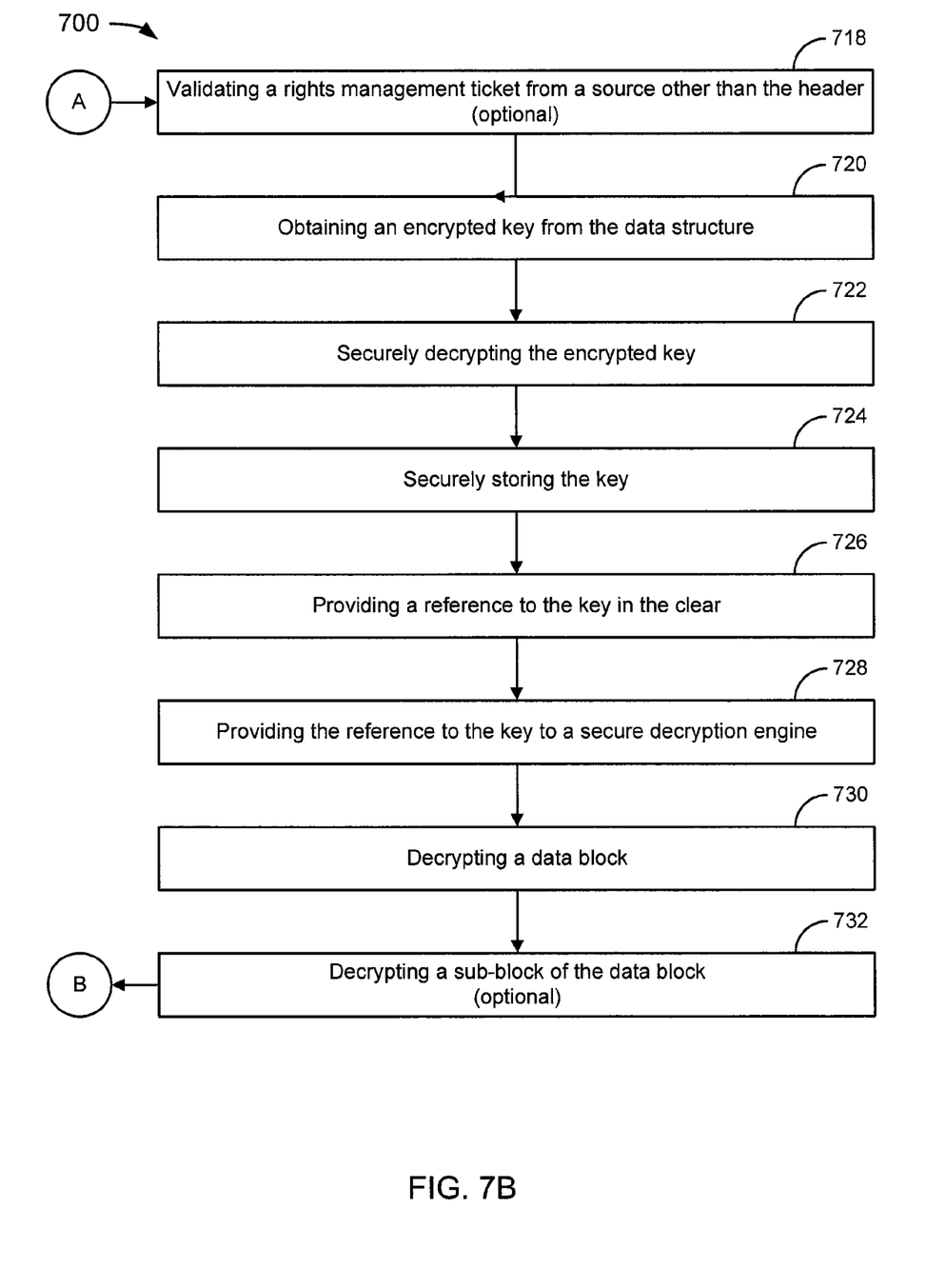
Figure 7C:
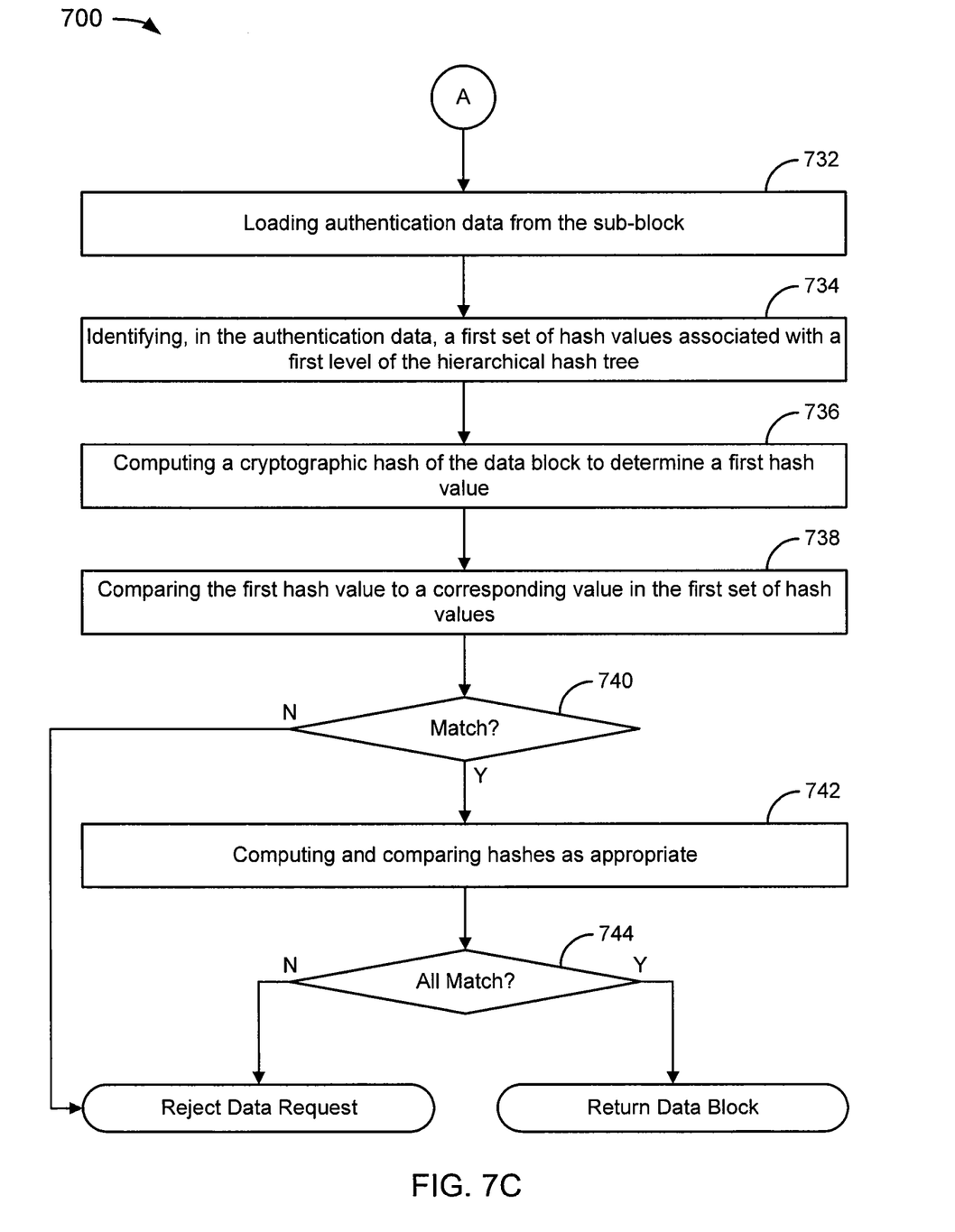

FIGS. 6A and 6B depict a flowchart 600 of an example of a method for secure block-based media access. In the example of FIG. 6A, the flowchart 600 begins at module 602 where a block-based media header is read. In the example of FIG. 6A, the flowchart 600 continues to module 604 where a ticket is validated and a reference to a decryption key is obtained.

In the example of FIG. 6A, the flowchart 600 continues to decision point 606 where it is determined whether the ticket is valid. If it is determined that the ticket is not valid (606-N), the process aborts and the flowchart 600 ends. If, on the other hand, it is determined that the ticket is valid (606-Y), the flowchart 600 continues to module 608 where a hash of H3 hashes are compared with the root hash value in the ticket. The comparison may be performed, for example, by security services.

In the example of FIG. 6A, the flowchart 600 continues to decision point 610 where it is determined whether the ticket is valid. If the comparison (608) is a match, it is assumed the ticket is valid. If it is determined that the ticket is not valid (610-N), the process aborts and the flowchart 600 ends. If, on the other hand, it is determined that the ticket is valid (610-Y), the flowchart 600 continues to module 612 where an H3 hash value of the set of H3 hashes is stored; and then a read request is awaited. The H3 hash value may be stored, for example, in secure DRAM.

In the example of FIG. 6A, the flowchart 600 continues to module 614 where a reference to a key to decrypt content is obtained. The reference to the key to decrypt content may be obtained, for example, by making a call to ticket services (with header information) to obtain the reference. In the example of FIG. 6A, the flowchart 600 continues to module 616 where a hash sub-block and a data sub-block of a read request are located. In the example of FIG. 6A, the flowchart 600 continues to module 618 where the hash sub-block and the data sub-block are decrypted. In the example of FIG. 6B, the flowchart 600 continues to module 620 where a hash of the data sub-block is calculated.

In the example of FIG. 6B, the flowchart 600 continues to module 622 where the hash of the data sub-block is compared against a corresponding H0 hash value in the set of H0 hashes. (See, e.g., FIG. 3.) In the example of FIG. 6B, the flowchart 600 continues to decision point 624 where it is determined whether the comparison yields a valid result. If it is determined that the result is not valid (624-N), then the flowchart 600 aborts the read request from the block-based media device. If, on the other hand, it is determined that the result is valid (624-Y), then the flowchart 600 continues to module 626 where a hash of the set of H0 hashes, including the H0 hash value, is calculated.

In the example of FIG. 6B, the flowchart 600 continues to module 628 where the hash of the set of H0 hashes is compared against a corresponding H1 hash value in the set of H1 hashes. (See, e.g., FIG. 3.) In the example of FIG. 6B, the flowchart 600 continues to decision point 630 where it is determined whether the comparison yields a valid result. If it is determined that the result is not valid (630-N), then the flowchart 600 aborts the read request from the block-based media device. If, on the other hand, it is determined that the result is valid (630-Y), then the flowchart 600 continues to module 632 where a hash of the set of H1 hashes, including the H1 hash value, is calculated.

In the example of FIG. 6B, the flowchart 600 continues to module 634 where the hash of the set of H1 hashes is compared against a corresponding H2 hash value in the set of H2 hashes. (See, e.g., FIG. 3.) In the example of FIG. 6B, the flowchart 600 continues to decision point 636 where it is determined whether the comparison yields a valid result. If it is determined that the result is not valid (636-N), then the flowchart 600 aborts the read request from the block-based media device. If, on the other hand, it is determined that the result is valid (636-Y), then the flowchart 600 continues to module 638 where a hash of the set of H2 hashes, including the H2 hash value, is calculated.

In the example of FIG. 6B, the flowchart 600 continues to module 640 where the hash of the set of H2 hashes is compared against the corresponding stored H3 hash value (612). (See, e.g., FIG. 3.) In the example of FIG. 6B, the flowchart 600 continues to decision point 642 where it is determined whether the comparison yields a valid result. If it is determined that the result is not valid (642-N), then the flowchart 600 aborts the read request from the block-based media device. If, on the other hand, it is determined that the result is valid (642-Y), then the flowchart 600 continues to module 644 where the block read request is fulfilled.

As used herein, the term "content" is intended to broadly include any data that can be stored in memory.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A method comprising:
   accessing a header including a data structure and a set of hash values;
   obtaining from the data structure a first root hash of a hierarchical hash tree;
   computing a second root hash from the set of hash values;
   comparing the first root hash to the second root hash;
   if the first root hash and the second root hash match,
      obtaining an encrypted key from the data structure;
      securely decrypting the encrypted key;
      securely storing the key such that the key is not passed in the clear;
      providing a reference to the key;
      decrypting a data block with the reference to the key;
      loading authentication data from a sub-block associated with the data block;
      identifying, in the authentication data, a first set of hash values associated with a first level of the hierarchical hash tree;
      computing a cryptographic hash of the data block to determine a first hash value;
      comparing the first hash value to a corresponding value in the first set of hash values;
      rejecting a block data request if the first hash value and the corresponding value in the first set of hash values do not match.

2. The method of claim 1, wherein the data structure is public key signed.

3. The method of claim 1, further comprising authenticating the data structure.

4. The method of claim 1, further comprising securely storing the set of hash values included in the header.

5. The method of claim 1, further comprising caching the hierarchical hash tree.

6. The method of claim 1, further comprising rejecting the header if the first root hash and the second root hash do not match.

7. The method of claim 1, further comprising validating a rights management ticket from a source other than the header.

8. The method of claim 1, wherein the reference to the key is provided in the clear.

9. The method of claim 1, wherein decrypting a data block with the reference to the key further comprises:
   providing the reference to the key to a secure decryption engine;
   decrypting the data block such that the key is not passed in the clear.

10. The method of claim 1, further comprising decrypting at least a portion of the sub-block.

11. The method of claim 1, further comprising, in each hash block:
    inserting a calculated hash in an appropriate location;
    computing the hash of the hash block.

12. The method of claim 1, if the first hash value matches the corresponding value in the first set of hash values, further comprising:
    computing a second hash value corresponding to the first set of hash values;
    identifying, in the authentication data, a second set of hash values associated with a second level of the hierarchical hash tree;
    comparing the second hash value to a corresponding value in the second set of hash values;
    rejecting the block data request if the second hash value and the corresponding value in the second set of hash values do not match.

13. The method of claim 12, if the second hash value matches the corresponding value in the second set of hash values, further comprising:
    computing a third hash value corresponding to the second set of hash values;
    identifying, in the authentication data, a third set of hash values associated with a third level of the hierarchical hash tree;
    comparing the third hash value to a corresponding value in the third set of hash values;
    rejecting the block data request if the third hash value and the corresponding value in the third set of hash values do not match.

14. The method of claim 13, if the third hash value matches the corresponding value in the third set of hash values, wherein the set of hash values of the header are a fourth set of hash values, and wherein the fourth set of hash values are associated with a fourth level of the hierarchical hash tree, further comprising:
    computing a fourth hash value corresponding to the third set of hash values;
    providing a fourth set of hash values associated with a fourth level of the hierarchical hash tree;
    comparing the fourth hash value to a corresponding value in the fourth set of hash values;
    rejecting the block data request if the fourth hash value and the corresponding value in the fourth set of hash values do not match;

returning the data block if the fourth hash value and the corresponding value in the fourth set of hash values match.

15. A system comprising:
a block-based media driver coupled to a security API, wherein, in operation, the block-based media driver accesses a header associated with a block-based media device and extracts authentication data from the header;
ticket services coupled to the block-based media driver and the security API, wherein, in operation, the ticket services receive the authentication data from the block-based media driver and send a key decryption request to the security API;
a security kernel including the security API, an encryption/decryption engine, and a key store accessible to the security API, wherein, in operation, the encryption/decryption engine decrypts the key, the key is stored in the key store, and the security API returns a reference to the key to the ticket services;
wherein, in operation, the ticket services validates the authentication data and returns the reference to the key to the block-based media driver;
wherein, in operation, the block-based media driver accesses data blocks of the block-based media device, sends a block decryption request to the security API, and the security kernel decrypts the blocks and validates a hierarchical hash tree associated with the data blocks.

16. The system of claim 15, further comprising the block-based media device, wherein the header associated with the block-based media device includes a root hash value and a plurality of root-child hash values.

17. The system of claim 15, further comprising the block-based media device, wherein the data blocks each include a hash sub-block and a plurality of content data blocks.

18. A system having a means for secure content delivery with block-based media, comprising:
a secure key store means;
a means for accessing an encrypted key from a header of a block-based media device;
a means for securely decrypting the encrypted key;
a means for securely storing the key in the key store;
a means for referencing the key to securely decrypt data blocks of the block-based media device;
a means for providing hash values in association with the block-based media device and each data block of the block-based media device.

19. The system of claim 18, further comprising a means for aborting block-based media device access if hash values in the header are rejected.

20. The system of claim 18, further comprising a means for aborting data block access if hash values in the data block are rejected.

21. A method comprising:
accessing a header including a data structure and a set of hash values;
obtaining from the data structure a first root hash of a hierarchical hash tree;
computing a second root hash from the set of hash values;
comparing the first root hash to the second root hash;
if the first root hash and the second root has match,
obtaining an encrypted key from the data structure;
securely decrypting the encrypted key;
securely storing the key such that the key is not passed in the clear;
providing a reference to the key;
loading authentication data from a sub-block associated with an encrypted data block;
identifying, in the authentication data, a first set of hash values associated with a first level of the hierarchical hash tree;
computing a cryptographic hash of the encrypted data block to determine a first hash value;
comparing the first hash value to a corresponding value in the first set of hash values;
rejecting a block data request if the first hash value and the corresponding value in the first set of hash values do not match;
decrypting the encrypted data block with the reference to the key.

* * * * *